(12) United States Patent
Srinivasaiah et al.

(10) Patent No.: US 8,332,396 B1
(45) Date of Patent: Dec. 11, 2012

(54) RESOURCE GEOTOPICALITY MEASURES

(75) Inventors: Manjunath Srinivasaiah, New York, NY (US); Daniel Francis Lieuwen, Somerville, NY (US); Krzysztof Czuba, New York, NY (US)

(73) Assignee: Google Inc., Mountain View, CA (US)

( * ) Notice: Subject to any disclaimer, the term of this patent is extended or adjusted under 35 U.S.C. 154(b) by 251 days.

(21) Appl. No.: 12/896,059

(22) Filed: Oct. 1, 2010

(51) Int. Cl.
*G06F 7/00* (2006.01)
*G06F 17/30* (2006.01)
(52) U.S. Cl. .................................. 707/723; 707/748
(58) Field of Classification Search .......... None
See application file for complete search history.

(56) References Cited

U.S. PATENT DOCUMENTS

| | | | |
|---|---|---|---|
| 7,428,487 B2 * | 9/2008 | Wang et al. ............... | 704/10 |
| 2005/0108213 A1 * | 5/2005 | Riise et al. ............... | 707/3 |
| 2009/0037403 A1 * | 2/2009 | Joy et al. ............... | 707/5 |

\* cited by examiner

*Primary Examiner* — Khanh Pham
*Assistant Examiner* — Azam Cheema
(74) *Attorney, Agent, or Firm* — Bracewell & Giuliani, LLP

(57) ABSTRACT

Methods, systems, and apparatus, including computer programs encoded on a computer storage medium, for measuring resource geotopicality. In one aspect, a method includes receiving geotokens for a resource, where each geotoken references a geographic location. An initial geotopicality score for a geographic location is computed using token attribute values of geotokens in the resource. A set of geotopical locations are selected for the resource based on the initial geotopicality score for the geographic location. Each geotopical location can be a geographic location for which the initial geotopicality score exceeds a geotopicality threshold. A final geotopicality score representing a measure of relevance for the resource relative to the geotopical location is computed for the geotopical location. Data specifying geotopical locations for the resource and geotopicality scores for the geotopical locations are provided.

19 Claims, 5 Drawing Sheets

RESOURCE GEOTOPICALITY MEASURES

BACKGROUND

This document relates to data processing.

The Internet provides access to a wide variety of resources such as video or audio files, web pages for particular subjects, book articles, or news articles. A search system can identify resources in response to a text search query that includes one or more search phrases (i.e., one or more words) or in response to user interactions with another interface such as a map interface that can include a location from the displayed map area with search phrases entered or selected by the user. The search system ranks the resources based on their relevance to the search query and on measures of quality of the resources and provides search results that link to the identified resources. The search results are typically ordered for viewing according to the rank.

Some users that provide a search query are interested in receiving search results referencing resources that include information relevant to a particular location. For example, a user that submits the search query "Atlanta Activities" may be searching for web pages that provide information about the city of Atlanta. However, search results provided in response to the search query may include a web page does not provide information about Atlanta, but rather merely includes the word Atlanta.

For example, one resource referenced by the search results may be a retailer site that includes a drop-down menu enabling the user to specify their current location in order to identify retail locations near the selected location. Another resource may include the word Atlanta in a footnote of the resource that specifies a business location of the company that developed the web page. Although both of the resources described above include the text "Atlanta," it is unlikely that these resources would satisfy the informational needs of the user that submitted the search query for "Atlanta Activities" because these resources provide very little information about the city of Atlanta.

SUMMARY

In general, one innovative aspect of the subject matter described in this specification can be embodied in methods that include the actions of receiving geotokens for a resource, each geotoken being a resource token that references a geographic location; for at least one geographic location referenced by the geotokens for the resource, computing an initial geotopicality score using token attribute values of geotokens in the resource, the token attribute values specifying a resource location of the geotoken in the resource; selecting a set of geotopical locations for the resource based on the initial geotopicality score for the at least one geographic location, each geotopical location being a geographic location for which the initial geotopicality score exceeds a geotopicality threshold; for each geotopical location, computing a final geotopicality score representing a measure of relevance for the resource relative to the geotopical location; and providing data specifying the geotopical locations for the resource and geotopicality scores for the geotopical locations. Other embodiments of this aspect include corresponding systems, apparatus, and computer programs, configured to perform the actions of the methods, encoded on computer storage devices.

These and other embodiments can each optionally include one or more of the following features. Computing the final geotopicality score for each geotopical location in the set can include computing, for each geotopical location in the set, a normalized geotopicality score based on a ratio of the initial geotopicality score for the geotopical location relative to a sum of initial geotopicality scores for the geotopical locations in the set.

Methods can further include the actions of determining a total quantity of references to the resource and geotokens that are included in the references to the resource, the references being located in other resources; for each geotopical location specified by the geotokens included in the data, computing an off-page geotopicality score for the resource, the off-page geotopicality score being computed based on a quantity of the references that specify the geotopical location; and computing an aggregate geotopicality score for each geotopical location using the final geotopicality score and the off-page geotopicality score.

Computing the off-page geotopicality score for each geotopical location can include computing a ratio of a quantity of the references to the resource that specify the geotopical location relative to the total quantity of the references to the resource. Computing the off-page geotopicality score for each geotopical location can include computing a ratio of a quantity of the references to the resource that specify the geotopical location relative to the total quantity of the references to the resource that include a geotoken.

Methods can further include the actions of identifying a geotoken that is included in boilerplate content; and removing the identified geotoken from the geotokens for the resource.

Computing an initial geotopicality score can include identifying, for each geotoken, the token attribute values for the geotokens; assigning each geotoken a weight based on the token attribute values for the geotoken; and computing the initial geotopicality score using the weight assigned to each geotoken. Identifying the token attribute values can include identifying, for each geotoken, at least one of a value representing a location of the geotoken on a web page, a value representing that the geotoken is included in a web page title, a value representing that the geotoken is a merger of two or more tokens, a value representing that the geotoken is bolded or highlighted, or a value representing that the geotoken is included in a web page tag.

Selecting a set of geotopical locations can include selecting at least one geographic location that has an initial geotopicality score that exceeds the geotopicality threshold and for which a ratio of the initial geotopicality score relative to a highest initial geotopicality score exceeds a minimum specified ratio.

Methods can further include the actions of receiving a search query that includes a reference to a geographic location; selecting a set of search results responsive to the search query, each search result referencing a resource; adjusting result scores for the selected search results using geotopicality scores for resources referenced by the search results; and providing data that cause presentation of the search results according to the adjusted result scores.

Selecting a set of geotopical locations can include selecting two or more geotopical locations for a single resource. Selecting a set of geotopical locations can include categorizing the geotokens using a location hierarchy; and selecting at least one location specified by the location hierarchy to be included in the set of geotopical locations.

Particular embodiments of the subject matter described in this specification can be implemented so as to realize one or more of the following advantages. Search results that are most likely relevant to a particular geographic location are assigned geotopicality scores that represent relative measures of relevance to adjust result scores for search queries for which particular geographic location is specified. The adjusted result scores may cause a presentation order of search results to be adjusted based on the relative relevance of the search results to the particular location. Thus, search results that have been determined to be more relevant to the particular location may be presented at more prominent display positions. In one or more implementations, boosting and reducing the weight of some geotokens (i.e., tokens that reference geographic locations) in a resource may result in a more accurate measure of geotopicality than geotopicality measurements that do not boost or reduce geotoken weight. For example, some geotokens may be more indicative of relevance than other geotokens. Therefore, increasing a weight that is assigned to geotokens that are more indicative of relevance may increase the accuracy of the measures of geotopicality.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
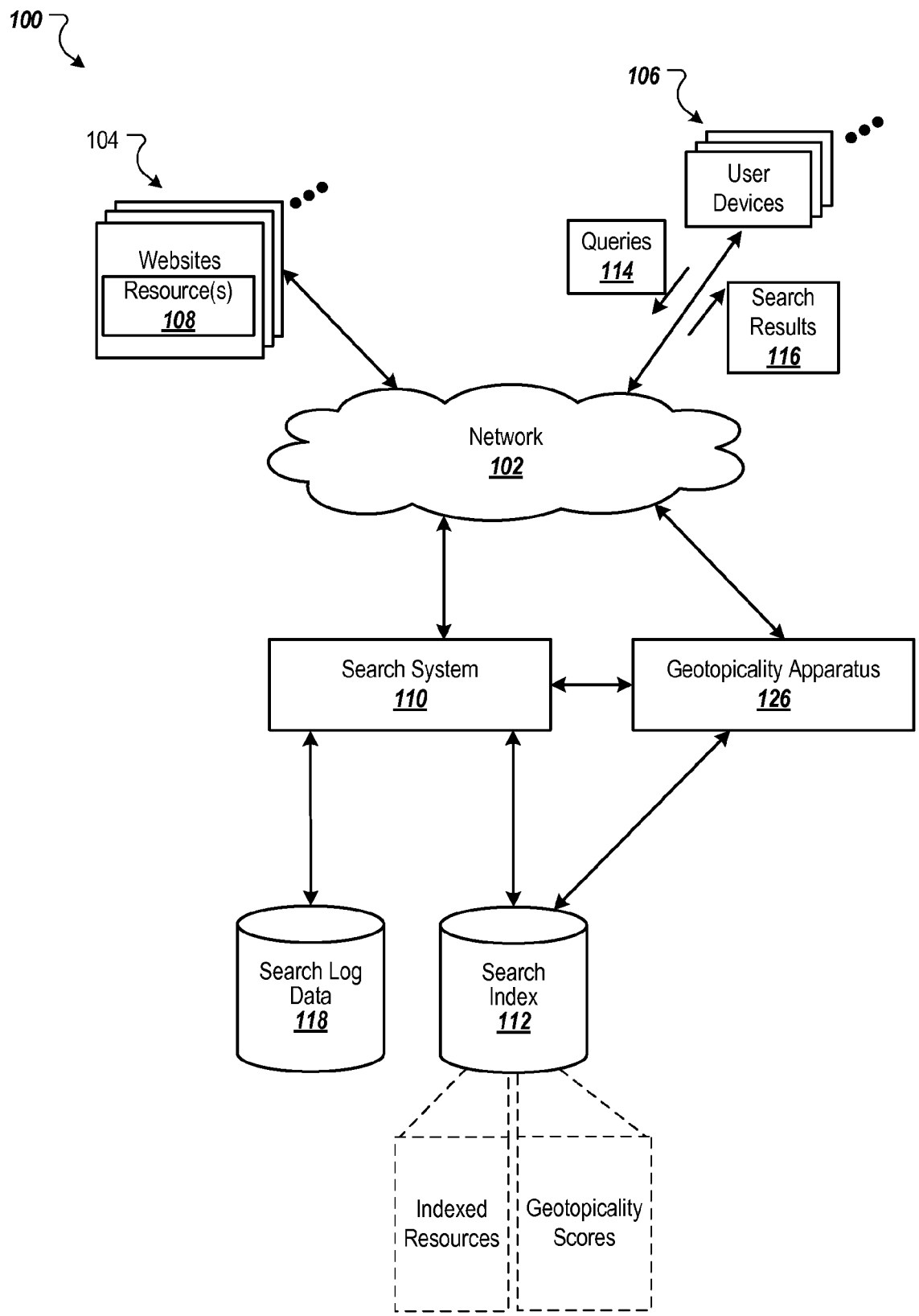
FIG. 1 is a block diagram of an example environment in which a search system provides search services.

Geotopicality scores specify measures of relevance between resources and geographic locations (e.g., address, point of interest, city, state, country, or other specified geographic location or region). Geotopicality scores are computed for resources to provide an indication of which resources are more relevant than other resources to a particular geographic location. For example, a first resource that has a higher geotopicality score for the location "Atlanta," is likely more relevant to the query "Atlanta Activities" than a second resource that has a lower geotopicality score for "Atlanta."

Geotopicality scores for resources can be used to adjust a presentation prominence (e.g., a presentation order) of search results that reference the resources. Continuing with the example above, geotopicality scores can be used to increase the presentation prominence of a search result for the first resource relative to the presentation prominence of a search result for the second resource. For example, when geotopicality scores are not used to select a presentation order for these search results, the search result that references the second resource may be selected for presentation at a higher presentation position than the search result that references the first resource. However, when geotopicality scores are used to select a presentation order for the resources, the higher geotopicality score for the first resource may result in the search result for the first resource being selected for presentation at a higher presentation position than the search result for the second resource.

Many resources are relevant to two or more different geographic locations. For example, a news article that discusses trade relations between the United States and Canada can be determined to be relevant to both the United States and Canada. Therefore, a single resource can have a separate geotopicality score for each geographic location that is referenced by the resource, as described in more detail below. Throughout this document the term geotopicality score is used to refer to a single geotopicality score for a single location unless otherwise specified.

An aggregate geotopicality score can be computed using an on-page geotopicality score and/or an off-page geotopicality score. An on-page geotopicality score is a value that is determined based on geotokens (i.e., tokens that reference a geographic location) that are included in the resource itself. For example, as described below, the on-page geotopicality score for a particular resource can be determined based on a quantity and/or type of textual references to a particular geographic location that are included in the resource. An off-page geotopicality score is determined based on geotokens that are included in references to the resource. For example, the off-page geotopicality score for the particular resource can be determined based, in part, on the inclusion of a geographic identifier (e.g., a city name) in the anchor text of an active link to the particular resource.

FIG. 1 is a block diagram of an example environment 100 in which a search system 110 provides search services. The example environment 100 includes a network 102, e.g., a local area network (LAN), wide area network (WAN), the Internet, or a combination of them, connects publishers 104, user devices 106, and the search system 110. The environment 100 may include many thousands publishers and user devices 106.

A web site 104 is one or more resources 108 associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource 108 is any data that can be provided by the web site 104 over the network 102 and that is associated with a resource address. Resources 108 include HTML pages, word processing documents, portable document format (PDF) documents, images, video, and feed sources, to name just a few. The resources can include content, e.g., words, phrases, images and sounds and may include embedded information (e.g., meta information and hyperlinks) and/or embedded instructions (e.g., JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources 108, the search system 110 identifies the resources 108 by crawling and indexing the resources 108 provided by the publishers 104. Data about the resources 108 can be indexed based on the resource 108 to which the data corresponds. The indexed and, optionally, cached copies of the resources 108 are stored in a search index 112.

The user devices 106 submit search queries 114 to the search system 110. In response, the search system 110 accesses the search index 112 to identify resources 108 that are predicted to be relevant to the search query 109, for example based on relevance scores that have been computed for the resources 108. The search system 110 selects resources 108, generates search results 116 that identify the resources 108, and returns the search results 116 to the user devices 106. A search result 116 is data generated by the search system 110 that references a resource 108 that is responsive to a particular search query, and includes an active link (e.g., a URL) to the resource. An example search result 116 can include a web page title, a snippet of text or a portion of an image extracted from the web page, and the URL of the web page.

User devices 106 receive the search results 116 and render the search results 116, for example, in the form of one or more web pages, for presentation to users. In response to the user selecting a link (e.g., URL) in a search result at a user device 106, the user device 106 requests the resource 108 referenced by the link. The web site 104 hosting the resource 108 receives the request for the resource 108 from the user device 106 and provides the resource 108 to the requesting user device 106.

Search queries 114 submitted during user sessions (e.g., specified periods over which queries are received for user devices and search results are provided to the user devices in response to the queries) are stored in a data store such as the search log data store 118. Selection data specifying actions taken in response to search results 116 provided are also stored in association with (i.e., indexed according to) the search query in a data store such as the search log data store 118. These actions can include whether a search result was selected by a user. In some implementations, location data specifying a geographic location of the user device that submitted the search query can also be stored in association with the search query in the search log data store 118. The data stored in the search log data store 118 can be used to map search queries 114 submitted during search sessions to resources 108 that were identified in search results 116 and the actions taken by users.

Search results 116 are selected to be provided to a user device 106 in response to a search query 114 based on result scores. Result scores are scores that represent a measure of relevance of the resource 108 to a search query. For example, a result score for a resource 108 can be computed based on an information retrieval ("IR") score corresponding to the resource 108, and, optionally, a quality score of the resource 108 relative to other available resources. A presentation order for the search results 116 can be selected according to and/or using the result scores. In turn, data that cause presentation of the search results 116 according to the presentation order can be provided to the user device 106.

The result score for a resource can be computed and/or adjusted using a geotopicality score for the resource. For example, the result score may be computed as a dot product, or another function, of the information retrieval score, the quality score, and/or the geotopicality score for the resource. The environment 100 includes a geotopicality apparatus 126 that computes geotopicality scores for resources. The geotopicality apparatus 126 is a data processing apparatus including one or more processors that are configured to compute geotopicality scores for resources based on references to geographic locations that are associated with the resource. A geographic reference (e.g., text identifying a geographic location) is associated with a resource by being included in the resource and/or being included in a reference (e.g., an active link) to the resource.

The geotopicality apparatus 126 computes an on-page geotopicality score for the resource. As described in more detail below, the geotopicality apparatus 126 determines the on-page geotopicality score for a resource 108 based on a quantity, placement, and/or specificity of geotokens (e.g., words, phrases, meta information, images, audio or other information specifying a geographic location) that are included in the resource 108. For example, a web page that includes the text "Atlanta, Ga." as a tag for the web page may have a higher on-page geotopicality score ("on-page score") for Atlanta than a web page that only includes "Atlanta" in a dropdown menu or other "boilerplate" content (e.g., content that is included in many different web pages independent of the topic to which the content is relevant).

The geotopicality apparatus 126 can also compute an off-page geotopicality score. As described in more detail below, the geotopicality apparatus 126 determines the off-page geotopicality score for a resource 108 based on a quantity of geotokens that are included in references to the resource. For example, the geotopicality apparatus 126 can determine the "Atlanta" off-page geotopicality score for a web page based on a quantity of active links that link to the web page and that include the anchor text "Atlanta" (or other references to Atlanta, such as zip codes for Atlanta). Thus, a web page that is more often referenced by active links having anchor text referencing "Atlanta" can have a higher "Atlanta" off-page geotopicality score ("off-page score") than another web page that is less often referenced by active links having anchor text referencing "Atlanta."

In some implementations, the geotopicality apparatus 126 computes an aggregate geotopicality score ("aggregate score") for a resource as a function of the on-page score and off-page score for the resource. For example, the aggregate score for a resource can be a sum, product, or another function of the on-page score and the off-page score for the resource. The geotopicality apparatus 126 can store on-page, off-page, and aggregate scores for the resources 108 in the search index 112. The search system 110 can use these scores to compute and/or adjust result scores for resources.

In some implementations, the geotopicality apparatus 126 does not compute aggregate scores for a resource having an on-page score that fails to exceed a minimum geotopicality threshold. For example, the geotopicality apparatus 126 can compare the on-page score for each resource to the geotopicality threshold, and compute aggregate scores only for those resources having on-page scores that exceed the geotopicality threshold. Thus, the resources that are assigned aggregate geotopicality scores can be limited to those resources that are considered to have at least a minimum specified on-page relevancy to the geographic location referenced by the geotokens.

When a resource has an on-page score that exceeds the geotopicality threshold, the geographic location referenced by the geotokens is referred to as a geotopical location for the resource. For example, Atlanta is considered to be a geotopical location for a web page having an "Atlanta" on-page score that exceeds the geotopicality threshold.

A single geotoken can be an indication of relevance to more than one specified geographic location. For example, the city Atlanta is located in Fulton County, which is located in the state of Georgia. Therefore, the geotoken "Atlanta" can be an indication that a web page is relevant to the city of Atlanta, Fulton County, and/or the state of Georgia. In some implementations, the geotopicality apparatus 126 can utilize hierarchical relationships between locations to determine a measure of relevance of a geotoken to a particular geographic location, as described in more detail below.

Figure 2:
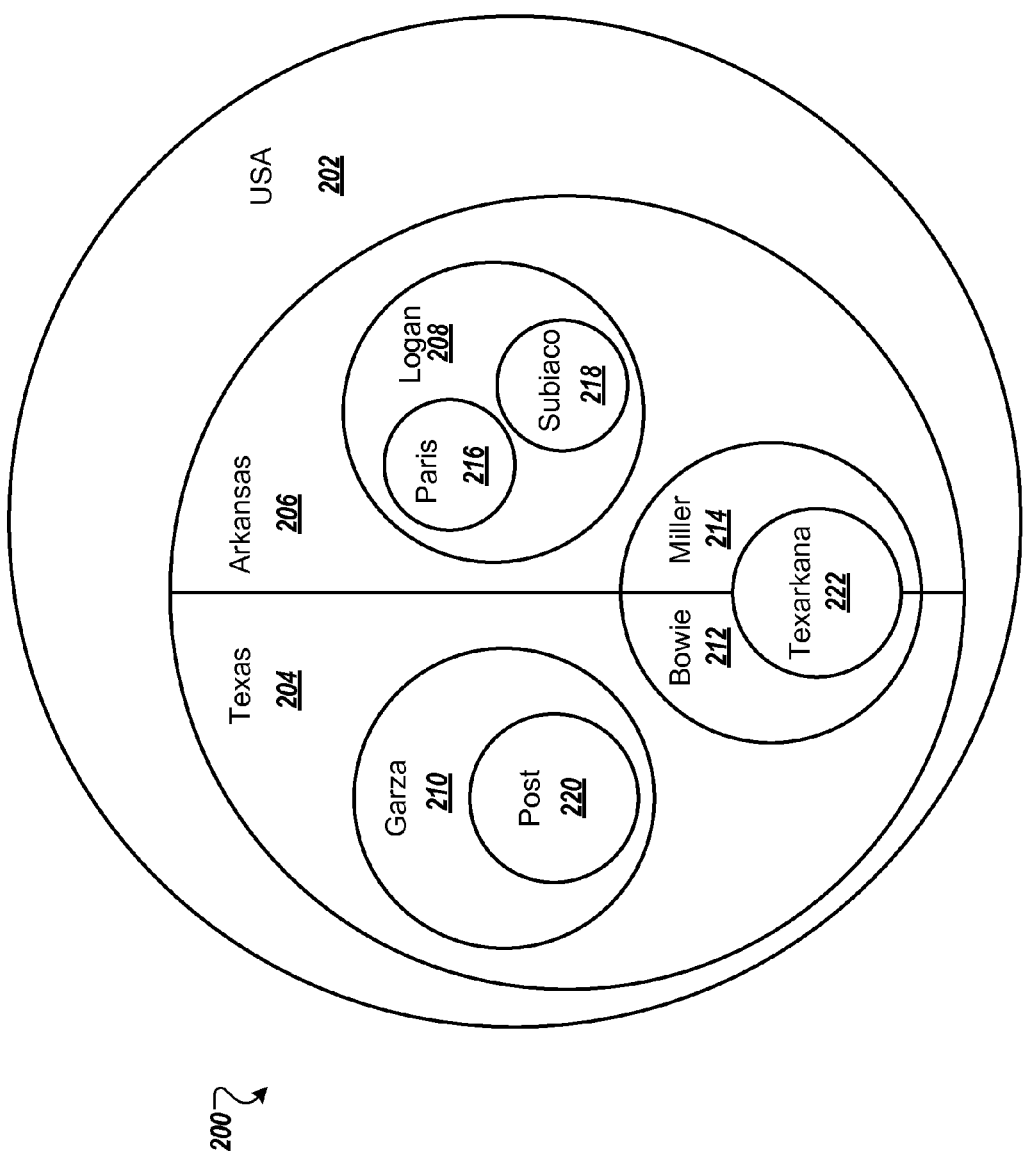
FIG. 2 is a Venn diagram of an example location hierarchy.

FIG. 2 is a Venn diagram 200 of an example location hierarchy. The Venn diagram illustrates logical relationships between geographic regions and may not be indicative of the size, shape, or directional relationship between geographic regions. The Venn diagram 200 illustrates hierarchical relationships between geographic locations from a national to a city level. It is noted that different governments define locations in different ways, and each level of the hierarchy is related to geographic locations of similar scale. For example, state level data may be related to a state, a province, or a territory, to name a few. City level data may be related to a city, a town, a village, a natural geographic feature, or a street address, to name a few.

The geotopicality apparatus 126 can use, for example, the location hierarchy shown in the Venn diagram 200 when determining geotopicality scores for the resource 108. The geotopicality apparatus 126 identifies geotokens for a resource and assigns the geotokens to a category in the hierarchy. For example, in response to identifying geotokens that display "USA", or similar geotokens such as "America", "United States of America" or "USofA" to name a few, are associated with USA 202. USA 202 is a national level category of geographic locations associated with the United States of America. USA 202 has no parent category in this example, but could be associated with a parent category, such as North America.

For the next level down in the hierarchy, the Venn diagram 200 includes two state level categories, Texas 204 and Arkansas 206. Geotokens that display "Texas", "Arkansas", or appropriate synonyms thereof such as "Lone Star State" or "US-AR" are associated with Texas 204 or Arkansas 206, as appropriate. Both Texas 204 and Arkansas 206 are contained within USA 202, indicating that USA 202 is a parent of both Texas 204 and Arkansas 206. Any geotoken associated with Texas 204 and Arkansas 206, when examined for national level association, resolve to USA 202.

Similarly, county level categories Logan 208, Garza 210, Bowie 212 and Miller 214 and city level categories Paris 216, Subiaco 218, Post 220, and Texarkana 222 are assigned geotokens that display associated names or synonyms. Parentage for city or county level categories is also determined similarly. For example, Post 220 resolves to Garza 210 at the county level, Texas 204 at the state level, and USA 202 at the national level.

Some categories span two or more parent categories. For example, some of the Great Lakes are in both the USA and Canada, the Rocky Mountains cover multiple states level areas in multiple countries, and some cities cross from one county or state to another. One such example city is Texarkana 222. The Texarkana metropolitan area contains two municipal areas: Texarkana, Arkansas and Texarkana, Texas. However, many resources may not specify a municipal area, so the category for Texarkana 222 can span the county level categories Bowie 212 and Miller 214, and the state level categories Texas 204 and Arkansas 206. Both Texas 204 and Arkansas 206 are within the national category USA 202 and thus Texarkana 222 resolves to USA 202 at the national level.

In some implementations, the geotopicality apparatus 126 uses the category to which a geotoken is assigned to determine a measure of relevance of the geotoken to another category. A geotoken is generally considered most relevant to the geographic location associated with the category to which the geotoken is assigned, and less relevant to each parent category. For example, a geotoken that is assigned to the Post category 220 can be considered to have descending relevance to the Post 220, Garza 210, Texas 204, and USA 202 categories, respectively.

The relevance of the geotoken relative to each of the geographic regions represented by the respective categories can be assigned based on the category to which the geotoken has been assigned as well as the hierarchical relationships of the categories. For example, the measure of relevance that is assigned to the geotoken relative to the Post category 220 can be higher than the measure of relevance that is assigned to the geotoken relative to the Texas category 204. As described in more detail below, the measures of relevance that are assigned to each geotoken for a resource are used to compute geotopicality scores for the resource.

Figure 3:
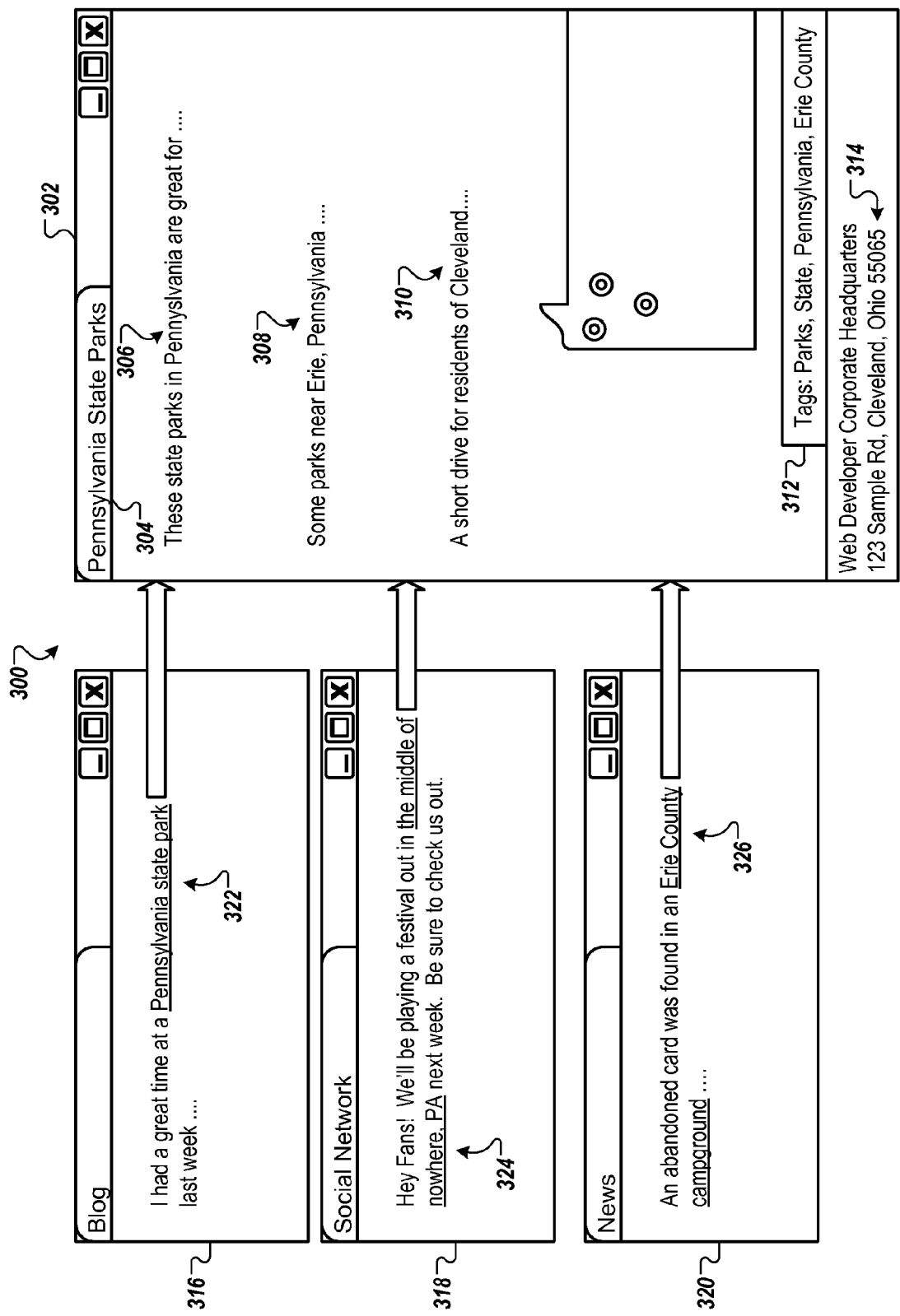
FIG. 3 is a block diagram of example resources that include geotokens.

FIG. 3 is a block diagram of example resources 300 that include geotokens. The geotokens may be used to calculate geotopicality scores, as described in more detail below. In some implementations, the resources 300 are web pages (or other online documents) that have been indexed by a search system. A computer system such as the geotopicality apparatus 126 examines tokens that have been indexed for (or are included in) resource 302 that includes content describing state parks in Pennsylvania. Tokens that include a full or partial reference to a geographic location can be identified as geotokens. For example, the resource 302 includes geotokens 304-314 (e.g., tokens referencing Pennsylvania, Erie, Cleveland, and other geographic locations).

The computer system can assign each geotoken 304-314 to a category of a location hierarchy such as that described with reference to FIG. 2. For example, geotokens 304 and 306 identify "Pennsylvania" and are assigned to a state level Pennsylvania category. Geotokens 308 and 312 respectively identify "Erie, Pa." and "Erie County, Pennsylvania" and are assigned to the "Erie" category, which is a child of the Pennsylvania category. Geotokens 310 and 314 respectively identify "Cleveland" and "Cleveland, Ohio" and are assigned to the "Cleveland" category, which is a child category of the "Cuyahoga" category, which is a child category for the "Ohio" category. Thus, four geotokens are considered relevant to the Pennsylvania category: two of the geotokens being directly assigned to the "Pennsylvania" category, and two being assigned to a child of the "Pennsylvania" category.

The locations of the geotokens in the resource 302 are also identified by the computer system. In some implementations, the relevance of geotokens can be determined based, in part, on the locations of the geotokens in the resource 302. Different resource areas (e.g., title, main text, and tags) may be given different weights in a formula to determine the measures of relevance for the geotokens and, in turn, an on-page score for the resource 302.

For example, the geotoken 304 is included in the title of the resource 302, and therefore, may be considered more influential for determining a geographic location to which the resource 302 is relevant than the geotoken 314 that is located in a footnote of the resource 302. In this example, the geotoken 304 may be assigned a higher "weight" for determining the relevance of the resource (i.e., relative to geographic locations) than the weight assigned to geotoken 314. Thus, geotoken 304 will be more influential than geotoken 314 for determining measures of relevance between the resource and particular geographic locations.

In some implementations, the weight assigned to a geotoken that appears in the title can be inversely proportional to a quantity of geographic locations that are referenced by geotokens in the title. If a single geographic location is referenced by a geotoken in a resource title, the weight assigned to the geotoken may be higher than the weight assigned to geotokens that respectively reference two or more different geographic locations. For example, when a single location is referenced by the title of the resource 302, it is more likely that the resource is relevant to the geographic location referenced by the geotoken than when multiple geotokens referencing multiple different locations are in the title.

Geotokens that are located near a beginning of a resource (e.g., within a threshold quantity of words of an article or within a threshold quantity of pixels of a top of the web page) are referred to as "leading geotokens" and may provide a reliable indication of the locations to which the resource 302 is relevant. Therefore, leading geotokens may be assigned a higher weight than geotokens that appear later in the resource (e.g., outside of the threshold quantity of words or outside of the threshold quantity of pixels).

For example, the geotoken 306 is in the first sentence of the first paragraph of the resource 302, and therefore, may be assigned a higher weight than the geotoken 308 that is included in the second paragraph of the resource 302. In another example, a news article might have a byline that includes a geotoken representing the location where the news article was filed and/or written. This geotoken may be assigned a higher weight than geotokens that appear later in the article because the location listed in the byline is often the location where events reported in the news article occurred. Therefore, this geotoken may be a reliable indication of a geographic location to which the news article is relevant.

Some resources (e.g., web pages) include tags, which may be presented to the user, as shown in the resource, or stored in meta information for the resource. These tags are often used by a resource author to facilitate indexing and discovery of a resource. Therefore, geotokens that are included in tags can be a reliable indicator of a location to which the resource is relevant. Accordingly, a geotoken that appears in a tag may be assigned a higher weight than a geotoken that appears in the body of an article. For example, the geotoken 312 is included in a tag of the resource 302 to indicate that the resource 302 is related to Erie County, Pennsylvania. Thus, the geotoken 312 may be assigned a higher weight than geotoken 310 because geotoken 310 was not identified, for example, as a leading geotoken, or otherwise determined to be assigned an increased weight.

Geotokens that are located in some portions of a resource can be eliminated or be assigned lower weights than other geotokens in the resource. For example, geotokens that are included in "boilerplate" content can be ignored, or be assigned a weight that is lower than the weights assigned to other geotokens in the resource. As noted above, boilerplate is content that is included in many different web pages independent of the topic to which the content is relevant. Example boilerplate includes document elements such as headers, footers, drop-down menus, and legal disclaimers. Boilerplate may be included in a resource to aid user navigation of the resource, to provide a consistent look and feel across web pages in a website, or may be the result of using a template to generate the resource. For example, the token 314 provides a location of the web developer that created the resource 302 in a footer of the resource 302. Therefore, the geotoken 314 can be identified as boilerplate since it is located in the footer of the resource 302.

Qualified geotokens can be assigned a higher weight than unqualified geotokens. Qualified geotokens are geotokens that are formed by the merger of two individual geotokens. For example, Cleveland and Ohio are both geotoken that when combined create the qualified geotoken "Cleveland, Ohio" (e.g., geotoken 314). The geotoken 314 is more specific than unqualified geotokens, such as the geotoken 310, which includes Cleveland, but does not include Ohio. Qualified geotokens generally include individual geotokens that are located adjacent to each other and/or appear in a specified sequence, but can be created from geotokens that are not adjacent to each other or in a specified sequence. For example, if Springfield and Ohio both appear on the page and no other states containing Springfield (e.g., Missouri or Illinois) appear on the page, then the geotokens Springfield and Ohio can be reliably combined to make the terms Springfield and Ohio less ambiguous.

A qualified geotoken can be assigned to a location category with more confidence, such that more qualified geotokens may be more reliable indicators of a geographic location to which the geotoken is referring. For example, the unqualified geotoken "Cleveland" in isolation could be referring to one of at least twenty six cities, towns, or other municipalities in America that are named Cleveland. However, when "Cleveland" is qualified by (e.g., appears with) "Ohio," the location being referred to is less ambiguous. In some implementations, parental support for a given location can be used to increase the weight of geotokens that are associated with that location. Parental support is a measure of the geotokens that are in child categories of a parent category. For example, in the resource 302, only two geotokens identify Erie, Pa., but Erie has parental support of 80% for Pennsylvania (i.e., four of five geotokens, not including the ignored geotoken 314, are assigned to or resolve to Pennsylvania) and 100% parental support for USA (all five non-ignored geotokens resolve to USA), for an average parental support of 90%.

The weights that are assigned to each geotoken can be specified using "boost factors." For example, the weight of a particular geotoken can be increased by 10% by multiplying the particular geotoken by a boost factor of 1.10. Similarly, the weight of a particular geotoken can be reduced by multiplying the particular geotoken by a boost factor that is less than 1.0.

The quantity of geotokens that reference a particular location and weights for each of the geotokens that reference the particular location can be used to determine an on-page score for the resource 302 relative to the particular location. For example, an initial on-page geotopicality score ("initial score") for a resource may be determined using relationship (1).

$$IS = (1 + \max(TS*TBF, QLG*LMBF))*(1 + QBF + TagBF) + (GC*PSBF) \qquad (1)$$

where,

IS is the initial score for the resource relative to a particular location;

TS is a title score value that is provided for a geotoken that is included in the title of the resource (e.g., 1.0 if the geotoken is in the title and 0.0 if the geotoken is not included in the title);

TBF is a title boost factor assigned to title geotokens;

QLG is a quantity of the geotokens that are leading geotokens;

LMBF is the boost factor assigned to leading geotokens;

QBF is the boost factor assigned to qualified geotokens;

TagBF is the boost factor assigned to geotokens located in tags;

GC is a total quantity of geotokens (or a log of the total quantity) that reference the particular location; and PSBF is the boost factor assigned for geotoken parental support.

For example, using the boost factors listed in table 1, the initial score (relative to Pennsylvania) for the resource 302 can be determined to be 10.03 (i.e., $(1+\max(1.0*1.2, 1.0*1.1))*(1+1.1+1.05)+(5*1.05)$).

TABLE 1

| Boost factor | Value |
| --- | --- |
| Title | 1.2 |
| Leading Mentions | 1.1 |
| Qualified Token | 1.1 |
| Tag | 1.05 |
| Parental Support | 1.05 |

Boost factors can be selected, for example, based on a statistical analysis of search logs (i.e., logs that specify search results that were clicked by users that submitted search queries) to estimate likelihoods that resources including particular geotokens are relevant to the geographic location referenced by the geotokens. These likelihoods can then be used to select boost factors based on (e.g., proportional to) the likelihoods.

A final on-page geotopicality score ("final score") for a particular location can be computed for a resource using the initial score for the particular location and other initial scores for other locations that are referenced by geotokens in the resource. In some implementations, the final score is computed by normalizing the initial score for the particular location using other initial scores for other locations. For example, the final score for a particular location can be computed using relationship (2)

$$FGS_i = IGS_i / Sum(IGS_{1-j}) \quad (2)$$

where, $FGS_i$ is the final score for location i;

$IGS_i$ is the initial score for location i;

$IGS_{1-j}$ are the initial scores for locations 1-j.

In some implementations, some or all of the initial scores can be adjusted prior to the normalization described above. For example, each initial score can be adjusted based on whether the particular location associated with the initial score is referenced by the title of the resource. For example, relationship (3) can be used to adjust the initial scores.

$$AdjustedIGS_i = IGS_i^{(1+TitleScore(i))} \quad (3)$$

where.

AdjustedIGS$_i$ is the adjusted initial score ("adjusted score") for location i;

$IGS_i$ is the initial score for location i; and

TitleScore(i) is the value that is provided when the location i is referenced by a geotoken that is included in the title of the resource (e.g., 1.0 if the geotoken is in the title and 0.0 if the geotoken is not included in the title—other values may be used).

Using relationship (3), the adjusted geotopicality scores for geotopical locations that are not referenced by the title of the resource will be the same as the initial scores (assuming that the title score is a binary value). However, the adjusted geotopicality score for a geotopical location that is referenced by the title of the resource will be greater than the initial score for the geotopical location. Following the adjustment of the initial scores (e.g., using relationship (3), the final scores can be computed using the adjusted geotopicality scores and relationship (2), as described above.

Other resource, such as resources 316-320 can include references 322-326 (e.g., hypertext links) to the resource 300. Each of the references 322-326 includes a geotoken. For example, reference 322 includes the geotoken Pennsylvania, while reference 326 includes the geotoken Erie County. Inclusion of a geotoken in a reference to a target resource (e.g., resource 302) is an indication that the target resource is relevant to the location specified by the geotoken. Therefore, geotokens that reference a target resource can be used when computing the final score for the target resource. For example, when a large portion of references to the target resource include geotokens that reference a same geographic location, it is likely that the target resource is relevant to the referenced geographic location.

In some implementations, the final score for a resource is adjusted using an off-page geotopicality score to compute an aggregate score. The off-page geotopicality score can be computed, for example, as a ratio of a quantity of references to the resource that specify a particular geographic location (e.g., a geotopical location) for the resource relative to a total quantity of references to the resource or relative to a quantity of the references that specify any geographic location. For example, an aggregate score can be a product, sum, or another function of a final on-page score, as described above, and the off-page geotopicality score. In some implementations, a resource may only be assigned an off-page score relative to a particular geographic location when at least a minimum threshold quantity of references to the resource specify the particular geographic location.

Figure 4:
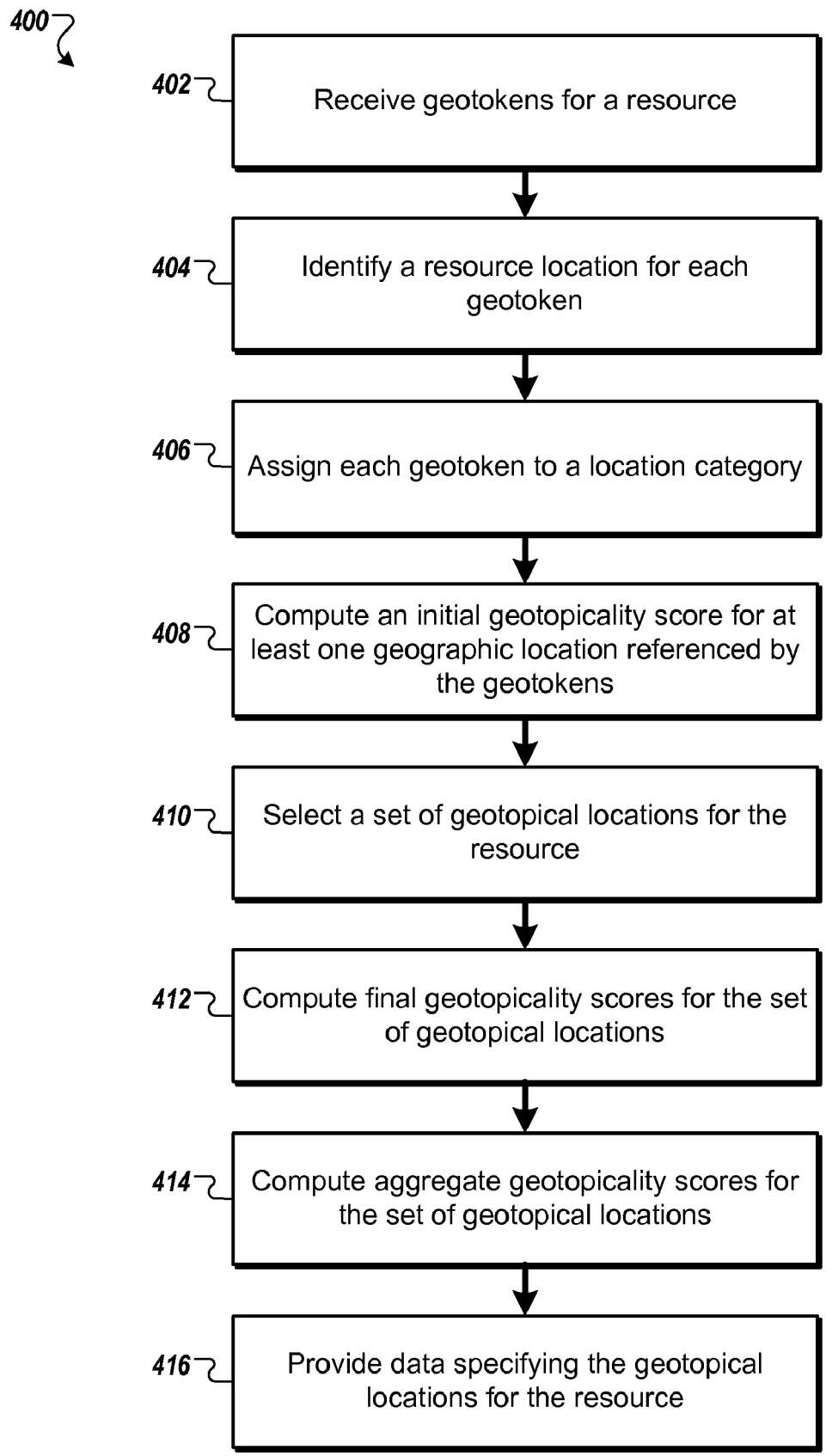
FIG. 4 is a flowchart of an example process for calculating an aggregate geotopicality score for a resource.

FIG. 4 is a flowchart of an example 400 process for calculating an aggregate geotopicality score for a resource. The process 400 is a process by which geotokens for a resource are received and an initial on-page geotopicality score is computed for a geographic location that is specified by the geotokens. A set of locations are selected as geotopical locations for the resource based on the initial score. A final score is then computed for each of the geotopical locations for the resource, and data that specify the geotopical locations and final scores are provided.

The process 400 can be implemented, for example, by the geotopicality apparatus 126, the search index 112, and/or the search system 110 of FIG. 1. In some implementations, the geotopicality apparatus 126 is a data processing apparatus that includes one or more processors that are configured to perform actions of the process 400. In some implementations, a computer readable medium can include instructions that when executed by a computer cause the computer to perform actions of the process 400.

Geotokens for a resource are received (402). In some implementations, each geotoken is a resource token (i.e., a word, set of words, audio file, video file, or other unit of content) that references a geographic location. Each geotoken can be identified from a set of resource tokens that have been indexed for the resource, for example, in a data store that stores data for the resource (e.g., the search index 112 of FIG. 1). The geotokens can be identified from a set of tokens that are stored with a reference to an index number and data type such that the resource can be represented by a string of tokens that have been extracted from the resource. For example, the tokens can be compared to a data set of known geographic locations. Tokens that match or substantially match a known geographic location (e.g., tokens that are stubs, synonyms, common misspellings, alternative names for known geographic locations, or otherwise identified to represent known locations) are identified as geotokens for the resource.

A token may also be examined in the context of surrounding tokens to determine if the token is used as a geotokens. For example, a number, followed by a proper noun, followed by a type of street or abbreviation thereof may be identified as a street address and marked as a geotoken. Adjacent geotokens may be identified and combined to create a qualified geotoken. For example, the text "Erie, Pa." can be treated as a single qualified geotoken, as described with reference to FIG. 3.

A resource location of each geotoken is identified (404). In some implementations, the resource location (i.e., a location of the geotoken in the resource) is specified by token attribute values. The token attribute values can also specify characteristics of the tokens. For example, in addition to specifying a location of the geotoken in a resource, the token attribute values can specify whether the geotoken is included in a tag for the resource or whether the geotoken is included in boilerplate content. The geotoken attribute values can also specify whether the geotoken is highlighted, bolded, or otherwise visually emphasized relative to other content that is presented with the resource. The geotoken attribute values can further specify whether the geotoken is included in a title of the resource or whether the geotoken is a merger of two or more tokens. In some implementations, when a geotoken is identified as being included in boilerplate, that geotoken can be removed from the geotokens that have been identified for the resource.

Each of the geotokens is assigned to a location category (406). In some implementations, the geotokens are assigned to a location category using a location hierarchy, such as the hierarchy described with reference to FIG. 2. Each geotoken can be assigned to the most specific category that the geotoken matches and/or the most specific category that matches the geotoken with at least a threshold certainty. For example, "Erie, Pa." may most narrowly be defined as referring to the city of Erie, but may be determined to be referring to the county of Erie, which includes the city of Erie, with a higher level of certainty.

An initial on-page geotopicality score ("initial score") is computed for at least one of the geographic locations referenced by the geotokens (408). In some implementations, the initial score is computed using token attribute values of geotokens that are included in the resource and that belong to a same location category. For example, the initial score for a particular geographic location can be computed using a quantity of geotokens that belong to the location category representing the particular geographic location and weights (e.g., boost factors) that are associated with the geotokens. As described with reference to FIG. 3, the relative importance of each geotoken for computing an initial score can be represented by a weight that is assigned to the geotoken. For example, the weight assigned to each geotoken can be based on the location of the geotoken in the resource and/or a content type (e.g., boilerplate or tag) for the geotoken.

In some implementations, portions of resources that are considered areas of high importance (e.g., for determining relevance of a resource to a particular location) may be predefined, and geotokens that fall within those areas may be assigned higher weights than other geotokens. For example, portions of a resource that contain an overview, summary, or which—according to resource authoring convention—are indicative of locations to which the resource is relevant may be identified as areas in which geotoken weight is increased relative to other geotokens. Examples of these high importance areas include a resource title, tag, and opening content (i.e., leading mentions). Geotokens that are considered to be in areas that are less indicative of the relevancy of the resource to a geographic location (e.g., boilerplate content) may be assigned a reduced weight relative to other content, or be assigned a weight of 0.0 (i.e., assigned a null weight).

A set of geotopical locations are selected for the resource (410). In some implementations, the geotopical locations are locations for which an initial score exceeds a geotopicality threshold. The geotopicality threshold can be selected, for example, based on a statistical analysis of geotopicality scores that have been identified as relevant to a particular location. For example, the threshold geotopicality score can be a median geotopicality score for resources that have been identified as relevant to the particular location. Alternatively, the threshold geotopicality score can be a median geotopicality score for resources that have been identified as not being relevant to the particular location.

In some implementations, the set of geotopical locations can be selected using a list of tuples (i.e., location, initial score) that are stored following computation of the initial scores. For example, the tuples can be ordered in descending order based on the initial scores, and any tuple having an initial score that does not exceed the geotopicality threshold can be removed.

Alternatively or additionally, geotopical locations can be selected based on the range of initial scores that have been computed for the resource. In some implementations, the geotopical locations are selected using ratios of the initial scores relative to a highest initial score that is associated with the resource. For example, assume that the highest initial score for a resource is 5, and that the resource is also associated with other geotopicality scores of 3, 2, and 1. In this example, the geotopical locations may be selected as those locations that are associated with an initial score of at least 2.0 (e.g., using a geotopicality threshold of 1.99) and for which the ratio of the initial score to the highest initial score exceeds a minimum specified ratio (e.g., 0.5). Thus, the locations associated with the geotopicality scores of 5 and 3 may be selected as geotopical locations for the resource because each of these scores has a value of at least 2.0, and has a ratio greater than 0.5 (i.e., 5/5 and 3/5 are each greater than 0.5).

Final on-page geotopicality scores ("final scores") are computed for the set of geotopical locations (412). In some implementations, the final score that is computed for each geotopical location represents a measure of relevance for the resource relative to the geotopical location. For example, a resource is considered to be more relevant to a geotopical location that is associated with a higher final score than a geotopical location that is associated with a lower final score.

As described above, final scores can be computed based on normalized initial scores. Each normalized initial score can be a score that is proportional to a ratio of the initial score relative to a sum of all initial scores for the resource. For example, the normalized initial scores can be computed using relationship (2).

In some implementations, the initial scores can be adjusted prior to being normalized. For example, each initial score can be adjusted based on whether the geotopical location associated with the geotopicality score is referenced by the title of the resource. For example, relationship (3) can be used to adjust the initial scores. The initial scores can also be normalized using other normalization techniques. For example, a lowest initial score and a highest geotopicality score can be respectively set to values of 0.0 and 1.0. In turn, each of the other initial scores can be normalized using linear, logarithmic, or other distribution techniques to assign values between zero and one.

In some implementations, an aggregate score for each geotopical location for the resource is computed using the final scores and off-page geotopicality scores for the resource (414). As described above, the off-page geotopicality scores for the resource can be determined based on a portion of the references to the resources that include geotokens. For example, a total quantity of references to the resource and the geotokens that are included in the references to the resource can be determined. In some implementations, a location hierarchy similar to that described with reference to FIG. 2 can be used to categorize off-page geotokens.

Using this data, an off-page geotopicality score can be computed for each of the geotopical locations for the resource. In some implementations, the off-page geotopicality score for each geotopical location is computed as a ratio of the quantity of references that specify the geotopical location relative to a total quantity of references to the resource (or a total quantity of references that include a geotoken). In turn, for each geotopical location, a product, sum, an average or another function of the off-page geotopicality score and the final score (e.g., the normalized and/or adjusted initial score) is computed to determine the aggregate score for the resource and the geotopical location. In some implementations, aggregate scores are only computed for those resources that are referenced by at least a threshold quantity of off-page geotokens that specify the geotopical location.

Data that specify the geotopical locations for the resource and the final (and/or aggregate) geotopicality scores are provided (416). In some implementations, the data are provided to a search system that uses the data to service search queries that specify a geographic location. In some implementations, the data are stored and indexed according to the resource.

Figure 5:
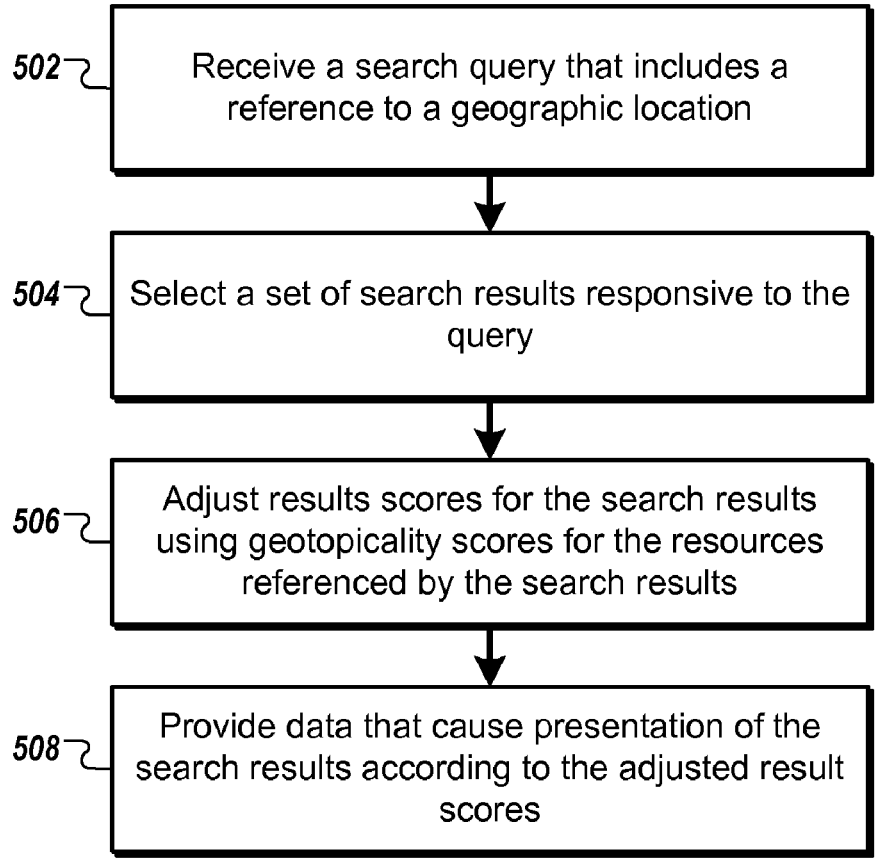
FIG. 5 is a flowchart of an example process for providing search queries using geotopicality scores.

FIG. 5 is a flowchart of an example process 500 for providing search queries using geotopicality scores. The process 500 is a process by which a set of search results that are responsive to a search query are selected in response to receiving the search result. In turn, result scores for the selected search results are adjusted using geotopicality scores for the search results and data that cause presentation of the search results according to the adjusted result scores are provided. In some implementations, the adjustment of the result scores results in a reordering of the search results for presentation. For example, a search result that is most relevant to a geographic location specified by the query (e.g., according to the geotopicality scores) can be promoted (e.g., assigned a higher page presentation position) following adjustment of the result scores, while a search result that is less relevant may be demoted (e.g., assigned a lower page presentation position) following adjustment of the result scores.

The process 500 can be implemented, for example, by the geotopicality apparatus 126, the search index 112, and/or the search system 110 of FIG. 1. In some implementations, the geotopicality apparatus 126 is a data processing apparatus that includes one or more processors that are configured to perform actions of the process 500. In other implementations, a computer readable medium can include instructions that when executed by a computer cause the computer to perform actions of the process 500.

A search query that includes a reference to a geographic location is received (502). In some implementations, the query includes a location phrase (i.e., one or more terms that specify a geographic location for a search query). A location phrase can be a city name, a zip code, a latitude/longitude coordinate pair, or another identifier of geographic location (i.e., a geographic identifier).

Location phrases can match a geographic identifier for particular geographic location by having a geographic identifier that includes any reference to the particular geographic region (e.g., zip code) or includes a reference to a location that is within a specified distance of a the particular geographic region. For example, if the particular geographic location includes the city of San Francisco and all areas within 50 miles of the center of San Francisco, then geographic identifiers for queries that reference the city of San Francisco (e.g., zip code 94131), or locations within 50 miles of the city of San Francisco, (e.g., Oakland, Calif.), will match the geographic identifier for the San Francisco region.

In some implementations, the location phrase can be determined and/or inferred based on a location of a user device that submitted the search query. The location of the user device can be detected based on user device data that is provided with the search query. For example, a user location associated with a particular search query can be detected using user profile data provided by the user and/or an anonymized Internet Protocol (IP) address (e.g., a hash value computed using the IP address) corresponding to the user device. When the user device is a mobile device (e.g., cell phone, Personal Data Assistant, smart phone, or other portable data communications device) the user location can also be provided by location-based services (e.g., GPS) that have been enabled by the user.

A set of search results are selected for the query (504). In some implementations, the set of search results are selected from search results that have been identified as responsive to the search query. For example, the set of search results can include those search results having a highest N result scores relative to the search query. The search results and corresponding result scores can be received, for example, from the search system 110 of FIG. 1. As described with reference to FIG. 1, the result scores can be determined by the search system 110, for example, based on IR scores for resources referenced by the search results and/or quality measures for the resources. The result scores can be used, for example, to select an initial or default ranking for the search results.

The result scores are adjusted using geotopicality scores for the resources that are referenced by the search results (506). In some implementations, the geotopicality scores that are used to adjust the result scores are the final or aggregate geotopicality scores for geotopical locations that are matched by the location phrase of the search query. The result scores can be adjusted, for example, by computing a sum, product, or another function of the result scores and the geotopicality scores for the matched geotopical location.

Location phrases can match a geographic identifier for a geotopical location by including a phrase that is an exact match of the geographic identifier or otherwise refers to the geotopical location with at least a threshold confidence. For example, if the geographic identifier for a particular geotopical location is a city name (e.g., Atlanta, Ga.), matching location phrases can include the same city name (e.g., Atlanta, Ga.), or other references, such as zip codes, area codes, or other indicia of location that are attributable to the city name. Continuing with this example, the location phrases "30309" "ATL GA" and "Atlanta Fulton County" can each be considered to match the geographic identifier "Atlanta, Ga."

Data that cause presentation of the search results according to the adjusted result scores are provided (508). The data can be provided in response to receipt of the search query. For example, the data can specify a list of search results and a relative (or absolute) presentation position for each of the search results. The data can be packaged into a data Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    identifying a plurality of geotokens for a resource, each geotoken referencing at least one of a plurality of locations
    computing an initial plurality of geotopicality scores for the resource corresponding to the plurality of locations based on the geotokens that respectively reference the plurality of locations;
    selecting a set of geotopical locations for the resource from among the plurality of locations by identifying locations having an initial geotopicality score that exceeds a geotopicality threshold;
    computing a plurality of final geotopicality scores for the resource, wherein each final geotopicality score corresponds to a location in the set of geotopical locations and is based on a ratio of the initial geotopicality score for the location to a sum of the initial geotopicality scores for all of the locations in the set of geotopical locations; and
    storing data associating the resource with the set of geotopical locations and geotopicality scores corresponding to each location in the set of geotopical locations.

2. The method of claim 1, further comprising:
    computing, for each geotopical location in the set of geotopical locations, an off-page geotopicality score based on a quantity of the references that link to the resource and that contain geotokens that specify the location; and
    computing an aggregate geotopicality score for each geotopical location in the set of geotopical locations using the final geotopicality score and the off-page geotopicality score.

3. The method of claim 2, wherein computing the off-page geotopicality score for each location in the set of geotopical locations comprises computing a ratio of a quantity of the references that link to the resource and that contain geotokens that specify the geotopical location relative to the total quantity of the references that link to the resource.

4. The method of claim 2, wherein computing the off-page geotopicality score for each location in the set of geotopical locations comprises computing a ratio of a quantity of the references that link to the resource and that contain geotokens that specify the location relative to the total quantity of the references that link to the resource and that include a geotoken that references any location.

5. The method of claim 1, wherein identifying a plurality of geotokens for a resource further comprises:
    identifying a geotoken that is included in boilerplate content; and
    removing the identified geotoken from the plurality of geotokens for the resource.

6. The method of claim 1, wherein computing the initial plurality of geotopicality scores for the resource comprises for each of the plurality of locations:
    identifying token attribute values for each of the one or more geotokens in the resource that reference the location;
    determining a weight for each of the token attribute values for the one or more geotokens; and
    computing the initial geotopicality score for the location using the weights determined for the one or more geotokens.

7. The method of claim 6, wherein identifying the token attribute values for each of the one or more geotokens in the resource that reference the location comprises identifying, for each such geotoken, at least one of a value representing a location of the geotoken on the resource, a value indicating that the geotoken is included in a title of the resource, a value representing that the geotoken is a merger of two or more tokens, a value representing that the geotoken is bolded or highlighted in the resource, or a value representing that the geotoken is included in a tag on the resource.

8. The method of claim 1, wherein selecting the set of geotopical locations further comprises selecting at least one geographic location that has an initial geotopicality score that exceeds the geotopicality threshold and for which a ratio of the initial geotopicality score relative to a highest initial geotopicality score exceeds a minimum specified ratio.

9. The method of claim 1, further comprising:
    receiving a search query that includes a reference to a geographic location;
    selecting a set of search results responsive to the search query;
    determining, for each search result in the set of search results, a geotopicality score for the geographic location;
    adjusting result scores for the selected search results using the geotopicality scores determined for each of the search results; and
    ordering the search results according to the adjusted result scores.

10. A non-transitory computer storage medium encoded with a computer program, the program comprising instructions that when executed by data processing apparatus cause the data processing apparatus to perform operations comprising:
    identifying a plurality of geotokens for a resource, each geotoken referencing at least one of a plurality of locations;

computing an initial plurality of geotopicality scores for the resource corresponding to the plurality of locations based on the geotokens that respectively reference the plurality of locations;

selecting a set of geotopical locations for the resource from among the plurality of locations by identifying locations having an initial geotopicality score that exceeds a geotopicality threshold;

computing a plurality of final geotopicality scores for the resource, wherein each final geotopicality score corresponds to a location in the set of geotopical locations and is based on a ratio of the initial geotopicality score for the location to a sum of the initial geotopicality scores for all of the locations in the set of geotopical locations; and storing data associating the resource with the set of geotopical locations and geotopicality scores corresponding to each location in the set of geotopical locations.

11. A system comprising:
memory; processor;
a user device; and
one or more computers operable to interact with the user device and further operable to:
identify geotokens for a resource, each geotoken referencing at least one of a plurality of locations;
compute an initial plurality of geotopicality scores for the resource corresponding to the plurality of locations based on the geotokens that respectively reference the plurality of locations;
select a set of geotopical locations for the resource from among the plurality of locations by identifying locations having an initial geotopicality score that exceeds a geotopicality threshold;
compute a plurality of final geotopicality scores for the resource, wherein each final geotopicality score corresponds to a location in the set of geotopical locations and is based on a ratio of the initial geotopicality score for the location to a sum of the initial geotopicality scores for all of the locations in the set of geotopical locations; and
store data associating the resource with the set of geotopical locations and geotopicality scores corresponding to each location in the set of geotopical locations.

12. The system of claim 11, wherein the one or more computers comprise a server operable to interact with the device through a data communication network, and the device is operable to interact with the server as a client.

13. The system of claim 11, wherein the one or more computers are further operable to:
compute for each location in the set of geotopical locations, an off-page geotopicality score based on a quantity of references that link to the resource and that contain geotokens that specify the location; and
compute an aggregate geotopicality score for each location using the final geotopicality score and the off-page geotopicality score.

14. The system of claim 13, wherein the one or more computers are further operable to compute a ratio of a quantity of the references that link to the resource and that contain geotokens that specify the location relative to the total quantity of the references that link to the resource.

15. The system of claim 13, wherein the one or more computers are further operable to compute a ratio of a quantity of the references that link to the resource and that contain geotokens that specify the location relative to the total quantity of the references that link to the resource and that include a geotoken that references any location.

16. The system of claim 11, wherein the one or more computers are further operable to: identify a geotoken that is included in boilerplate content; and
remove the identified geotoken from the plurality of geotokens for the resource.

17. The system of claim 11, wherein the one or more computers are further operable to identify, for each geotoken, at least one of a value representing a location of the geotoken on the resource, a value indicating that the geotoken is included in a title of the resource, a value representing that the geotoken is a merger of two or more tokens, a value representing that the geotoken is bolded or highlighted in the resource, or a value representing that the geotoken is included in a tag on the resource.

18. The system of claim 11, wherein the one or more computers are further operable to select at least one geographic location that has an initial geotopicality score that exceeds the geotopicality threshold and for which a ratio of the initial geotopicality score relative to a highest initial geotopicality score exceeds a minimum specified ratio.

19. The system of claim 11, wherein the one or more computers are further operable to:
receive a search query that includes a reference to a geographic location;
select a set of search results responsive to the search query, each search result referencing a resource;
determine, for each search result in the set of search results, a geotopicality score for the geographic location;
adjust result scores for the selected search results using geotopicality scores for resources referenced by the search results; and
order the search results according to the adjusted result scores.

* * * * *